(12) United States Patent
Shimauchi et al.

(10) Patent No.: US 10,291,864 B2
(45) Date of Patent: May 14, 2019

(54) IMAGE PROCESSING DEVICE AND IMAGE PROCESSING METHOD

(71) Applicant: SONY CORPORATION, Tokyo (JP)

(72) Inventors: Kazuhiro Shimauchi, Tokyo (JP); Nobuho Ikeda, Kanagawa (JP); Seijiro Inaba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 261 days.

(21) Appl. No.: 15/302,360

(22) PCT Filed: Apr. 9, 2015

(86) PCT No.: PCT/JP2015/061082
§ 371 (c)(1),
(2) Date: Oct. 6, 2016

(87) PCT Pub. No.: WO2015/159789
PCT Pub. Date: Oct. 22, 2015

(65) Prior Publication Data
US 2017/0026586 A1    Jan. 26, 2017

(30) Foreign Application Priority Data
Apr. 17, 2014  (JP) ................................ 2014-085198

(51) Int. Cl.
*H04N 5/265*      (2006.01)
*G06T 7/20*       (2017.01)
(Continued)

(52) U.S. Cl.
CPC .......... *H04N 5/265* (2013.01); *G06T 3/4038* (2013.01); *G06T 7/20* (2013.01); *G06T 7/38* (2017.01);
(Continued)

(58) Field of Classification Search
CPC ...... H04N 5/243; H04N 5/265; H04N 5/2258; H04N 5/23238; H04N 5/23267; G06T 7/20; G06T 7/38; G03B 35/02
See application file for complete search history.

(56) References Cited

U.S. PATENT DOCUMENTS 9,307,148 B1\* 4/2016 Baldwin ............ H04N 5/23267
2010/0253798 A1\* 10/2010 Doida .................... H04N 5/243
                                                                348/222.1
(Continued)

FOREIGN PATENT DOCUMENTS

JP    2004-242047 A    8/2004
JP    2006-135386 A    5/2006
(Continued)

*Primary Examiner* — Obafemi O Sosanya
(74) *Attorney, Agent, or Firm* — Chip Law Group

(57) ABSTRACT

It is possible to generate a panoramic moving image with a high combination performance while suppressing a calculation amount. The positional-shift-amount acquisition unit acquires positional shift amounts of a predetermined number of frames from a first moving image and a second moving image captured by cameras, each of the first and second moving images including a plurality of frames. The frame selection unit selects the predetermined number of frames from the plurality of frames. For example, the frame selection unit selects the predetermined number of frames on the basis of sensor output and/or image processing results. An image combination unit combines the first moving image and the second moving image on the basis of the positional shift amounts of the predetermined number of frames to obtain a panoramic image.

17 Claims, 15 Drawing Sheets

(51) Int. Cl.
*H04N 5/232* (2006.01)
*G06T 7/38* (2017.01)
*G06T 3/40* (2006.01)
*H04N 5/225* (2006.01)
*G03B 37/04* (2006.01)

(52) U.S. Cl.
CPC ....... *H04N 5/2258* (2013.01); *H04N 5/23238* (2013.01); *G03B 37/04* (2013.01); *G06T 2200/32* (2013.01); *G06T 2207/10016* (2013.01)

(56) References Cited

U.S. PATENT DOCUMENTS

| | | | |
|---|---|---|---|
| 2010/0315522 A1 | 12/2010 | Tsurumi | |
| 2012/0105597 A1* | 5/2012 | Tajiri | G03B 35/02 348/49 |
| 2012/0182400 A1* | 7/2012 | Yamashita | G03B 35/02 348/50 |
| 2013/0315558 A1* | 11/2013 | Nakamura | H04N 9/87 386/230 |
| 2014/0223305 A1* | 8/2014 | Nakano | G06F 3/0484 715/719 |
| 2015/0012644 A1* | 1/2015 | Kubota | G06F 11/3419 709/224 |

FOREIGN PATENT DOCUMENTS

| | | |
|---|---|---|
| JP | 2009-141820 A | 6/2009 |
| JP | 2010-252015 A | 11/2010 |
| JP | 4577765 B | 11/2010 |
| JP | 4577765 B2 | 11/2010 |
| WO | 2006/022630 A | 3/2006 |
| WO | 2006/022630 A1 | 3/2006 |
| WO | 2008/087721 A | 7/2008 |
| WO | 2008/087721 A1 | 7/2008 |

\* cited by examiner

FIG.2
FIG. 2A
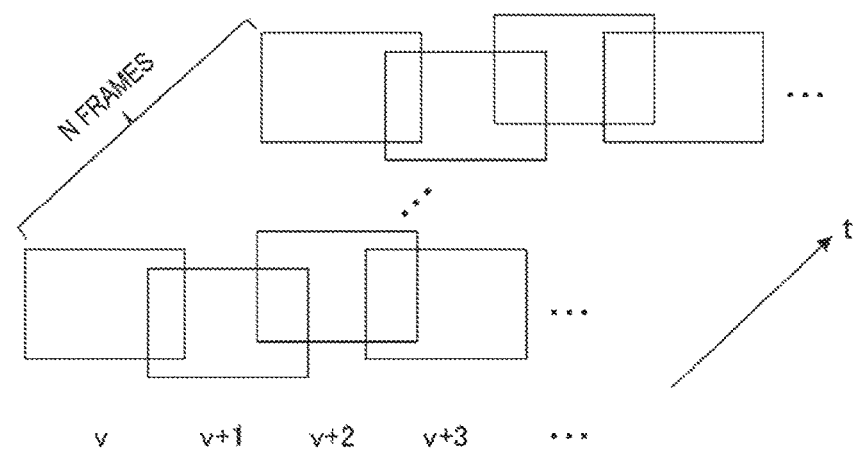
FIG. 2B
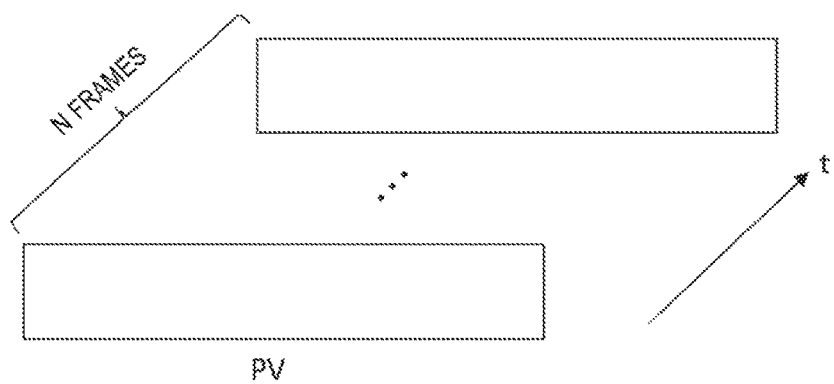

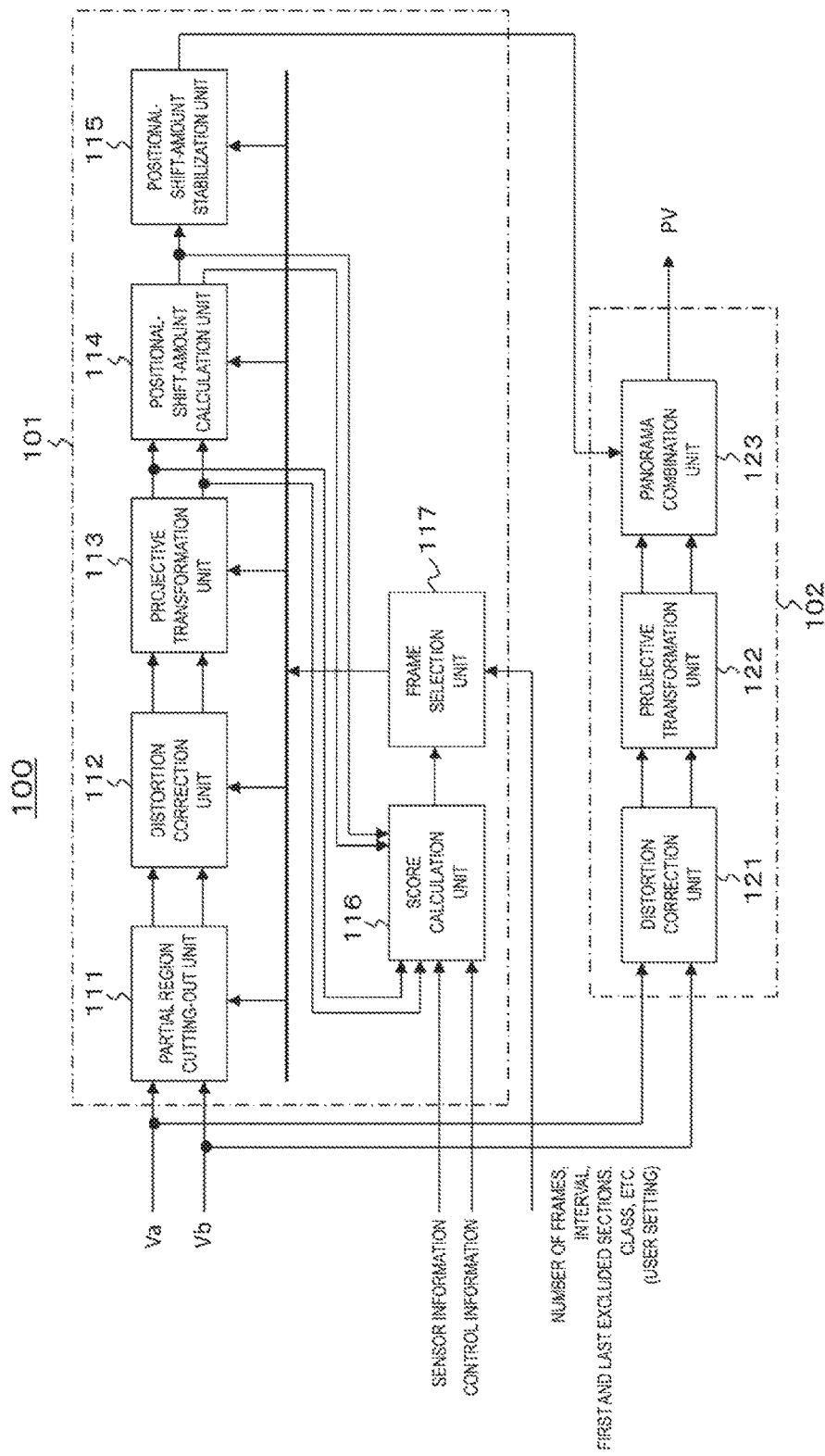

IMAGE PROCESSING DEVICE AND IMAGE PROCESSING METHOD

CROSS REFERENCE TO RELATED APPLICATIONS

This application is a U.S. National Phase of International Patent Application No. PCT/JP2015/061082 filed on Apr. 9, 2015, which claims priority benefit of Japanese Patent Application No. JP 2014-085198 filed in the Japan Patent Office on Apr. 17, 2014. Each of the above-referenced applications is hereby incorporated herein by reference in its entirety.

TECHNICAL FIELD

The present technique relates to an image processing device, an image processing method, and a program and particularly relates to an image processing device and an image processing method for processing a plurality of moving images including overlapping regions.

BACKGROUND ART

When a panoramic moving image is generated by using a plurality of moving images, it is not realistic to perform positional-shift-amount calculation processing on all frames in terms of performance and a calculation cost. For example, Patent Literature 1 seeks a solution by calculating a positional shift amount in a first frame and, in subsequent frames, correcting the positional shift amount on the basis of a result of motion detection between the frames.

CITATION LIST

Patent Literature

Patent Literature 1: JP 4577765B

SUMMARY OF INVENTION

Technical Problem

In a technique disclosed in Patent Literature 1, regions to be used for positioning are not limited. Therefore, when a positional shift amount is calculated by using information on parts other than overlapping parts of moving images, a positional-shift-amount calculation performance is reduced, and, because calculation is performed on the whole region, a calculation cost is increased. Further, in the technique disclosed in Patent Literature 1, correction is performed in each frame. Thus, when a vector varies in each frame, an image is blurred, and therefore it is difficult to see the image, and, because calculation is performed in each frame, the calculation cost is increased.

An object of the present technique is to obtain a panoramic moving image by generating a panoramic moving image with a high combination performance while suppressing a calculation amount.

Solution to Problem

The concept of the present technique is an image processing device, including: a positional-shift-amount acquisition unit configured to include a frame selection unit configured to select a first moving image and a second moving image, each of which has a predetermined number of frames, from a first moving image and a second moving image, each of which has a plurality of frames captured by a camera, and acquire positional shift amounts of the predetermined number of frames from the first moving image and the second moving image, each of which has the predetermined number of frames selected in the frame selection unit.

In the present technique, the positional-shift-amount acquisition unit acquires positional shift amounts of a predetermined number of frames from a first moving image and a second moving image captured by cameras, each of the first and second moving images including a plurality of frames. The frame selection unit selects the predetermined number of frames from the plurality of frames. For example, the frame selection unit may select the predetermined number of frames on the basis of sensor output and/or image processing results. In this case, for example, the predetermined number of frames are selected in terms of, for example, a frame-positional-shift-amount calculation performance. For example, when a moving image includes N frames, M frames (N>M) are selected.

For example, the frame selection unit may select, as the predetermined number of frames, a frame having a small number of close subjects. In addition, for example, the frame selection unit may select, as the predetermined number of frames, a frame that is not obtained by irregular camerawork. In addition, for example, the frame selection unit may select, as the predetermined number of frames, a frame having a large number of high frequency components.

In addition, for example, the frame selection unit may select, as the predetermined number of frames, a frame having high reliability. In addition, for example, the frame selection unit may select, as the predetermined number of frames, frames having close positional shift amounts. In addition, for example, the frame selection unit may classify the positional shift amounts into classes and select, as the predetermined number of frames, a frame having positional shift amounts belonging to a predetermined class.

In addition, for example, the frame selection unit may select, as the predetermined number of frames, arbitrary consecutive frames. In addition, for example, the frame selection unit may select, as the predetermined number of frames, frames having an arbitrary interval. In addition, for example, the frame selection unit does not have to select, as the predetermined number of frames, frames in first and/or last certain periods.

As described above, in the present technique, positional shift amounts of a predetermined number of frames selected from a plurality of frames are acquired. Therefore, it is possible to reduce a calculation cost for obtaining a positional shift amount. Further, as the positional shift amounts, only accurate positional shift amounts can be acquired.

In the present technique, for example, the image processing device may further include: an image combination unit configured to combine the first moving image and the second moving image on the basis of the positional shift amounts of the predetermined number of frames to obtain a panoramic moving image. In this case, for example, when the predetermined number of frames is a plurality of frames, the image combination unit may obtain one or a plurality of positional shift amounts on the basis of the predetermined number of positional shift amounts and use the one or plurality of positional shift amounts. In this case, it is possible to generate a panoramic moving image with a high combination performance while suppressing a calculation amount.

In addition, in the present technique, for example, the positional-shift-amount acquisition unit may obtain the positional shift amounts after processing for matching spatial frequencies of the first moving image and the second moving image is performed. In this case, it is possible to improve a positional-shift-amount detection performance.

Another concept of the present technique is an image processing device including: a positional-shift-amount acquisition unit configured to acquire positional shift amounts of a predetermined number of frames from a first moving image and a second moving image captured by cameras, each of the first and second moving images including a plurality of frames; a frame selection unit configured to select the predetermined number of frames from the plurality of frames; and an image combination unit configured to combine the first moving image and the second moving image on the basis of the positional shift amounts of the predetermined number of frames to obtain a panoramic image.

In the present technique, the positional-shift-amount acquisition unit acquires positional shift amounts of a predetermined number of frames from a first moving image and a second moving image captured by cameras, each of the first and second moving images including a plurality of frames. The frame selection unit selects the predetermined number of frames from the plurality of frames on the basis of, for example, a frame-positional-shift-amount calculation performance. The image combination unit combines the first moving image and the second moving image on the basis of the positional shift amounts of the predetermined number of frames, thereby obtaining a panoramic image.

As described above, in the present technique, positional shift amounts of a predetermined number of frames selected from a plurality of frames are acquired, and moving images are combined on the basis of the positional shift amounts. Therefore, it is possible to generate a panoramic moving image with a high combination performance while suppressing a calculation amount.

In the present technique, for example, the positional-shift-amount acquisition unit may obtain the positional shift amounts after processing for matching spatial frequencies of the first moving image and the second moving image is performed. In addition, in the present technique, for example, when the predetermined number of frames is a plurality of frames, the image combination unit may obtain one or a plurality of positional shift amounts on the basis of the predetermined number of positional shift amounts and uses the one or plurality of positional shift amounts.

Advantageous Effects of Invention

According to the present technique, it is possible to generate a panoramic moving image with a high combination performance while suppressing a calculation amount. Note that effects described in this specification are merely examples and are not limited, and an additional effect may be exerted.

BRIEF DESCRIPTION OF DRAWINGS

FIGS. 2A and 2B is a view for explaining generation of a panoramic moving image from a plurality of moving images.

FIG. 3 is a block diagram showing an example of specific configurations of a positional-shift-amount acquisition unit and an image combination unit of the panoramic moving image generation device.

DESCRIPTION OF EMBODIMENT(S)

Hereinafter, forms for implementing an invention (hereinafter, referred to as "embodiments") will be described. Note that description will be provided in the following order.
1. First Embodiment
2. Second Embodiment
3. Modification Example 1. First Embodiment

[Configuration Example of Panoramic Moving Image Generation Device]

Figure 1:
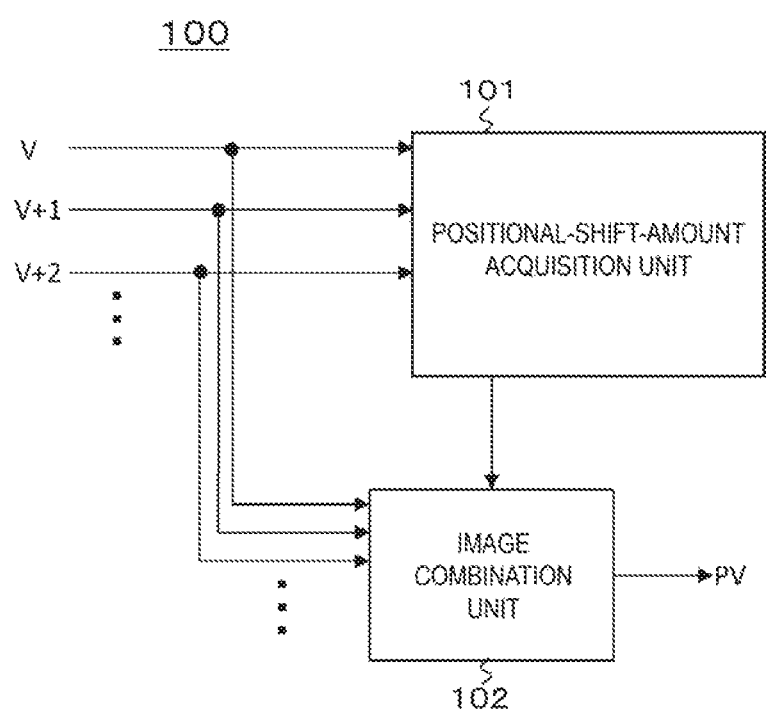
FIG. 1 is a block diagram showing a configuration example of a panoramic moving image generation device according to a first embodiment.

FIG. 1 shows a configuration example of a panoramic moving image generation device 100 according to a first embodiment. The panoramic moving image generation device 100 performs positioning on moving images v, v+1, v+2, v+3, . . . , each of which includes a plurality of N frames, to combine the moving images as shown in FIG. 2(a) and generates a panoramic moving image including the N frames as shown in FIG. 2(b).

The panoramic moving image generation device 100 includes a positional-shift-amount acquisition unit 101 and an image combination unit 102. The positional-shift-amount acquisition unit 101 acquires positional shift amounts of a predetermined number of frames selected from the N frames with respect to every two adjacent moving images (first moving image, second moving image) of the plurality of moving images v, v+1, v+2, v+3, . . . . The image combination unit 102 performs positioning on every two adjacent moving images while referring to the positional shift amounts of the predetermined number of frames acquired in the positional-shift-amount acquisition unit 101 and combines the moving images, thereby generating a panoramic moving image PV.

FIG. 3 shows an example of specific configurations of the positional-shift-amount acquisition unit 101 and the image combination unit 102 of the panoramic moving image generation device 100. Herein, in order to simplify description, an example where two moving images Va and Vb are combined to generate a panoramic moving image PV will be described.

The positional-shift-amount acquisition unit 101 includes a partial region cutting-out unit 111, a distortion correction unit 112, a projective transformation unit 113, a positional-shift-amount calculation unit 114, a positional-shift-amount stabilization unit 115, a score calculation unit 116, and a frame selection unit 117. The image combination unit 102 includes a distortion correction unit 121, a projective transformation unit 122, and a panorama combination unit 123.

Figure 4:
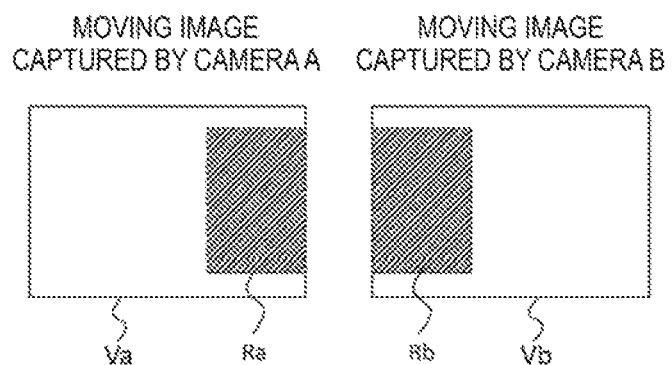
FIG. 4 is a view for explaining processing of a partial region cutting-out unit.

The partial region cutting-out unit 111 receives the moving image Va captured by a camera A and the moving image Vb captured by a camera B as input and cuts out regions (hatched parts) which are supposed to be overlapped with each other as shown in FIG. 4. Ra indicates a cut-out region of the moving image Va, and Rb indicates a cut-out region of the moving image Vb.

Herein, it is unnecessary to strictly calculate overlapping regions as the cut-out regions. For example, approximate overlapping regions may be obtained in advance on the basis of an installation angle between two cameras that capture the moving image Va and the moving image Vb and internal parameters of the cameras (lens distortion and other information inherent to the cameras). Alternatively, a region having an arbitrary ratio with respect to the whole region may be defined as the cut-out region. This cutting-out makes it possible to reduce a region that is unnecessary for positional-shift-amount calculation described below, and therefore it is possible to improve performance and reduce a calculation cost in subsequent processing.

The distortion correction unit 112 corrects distortion of the cut-out regions Ra and Rb cut out by the partial region cutting-out unit 111. Herein, distortion is lens distortion of a camera, distortion caused by an installation error of an image sensor, and the like. The distortion correction unit 112 corrects the distortion in consideration of in which region in the moving images Va and Vb the cut-out regions Ra and Rb are located.

The projective transformation unit 113 projectively transforms the cut-out regions Ra and Rb whose distortion has been corrected in the distortion correction unit 112. Herein, projective transformation is, for example, processing of transforming a flat surface into a flat surface, a cylindrical surface, and a spherical surface. Desired processing is performed depending on a panoramic moving image to be generated. A user may select the kind of projective transformation and a method thereof. Alternatively, appropriate projective transformation may be automatically selected on the basis of an angle of view and an installation condition of each camera. The projective transformation unit 113 performs projective transformation in consideration of in which region in the moving images Va and Vb the cut-out regions Ra and Rb are located.

The positional-shift-amount calculation unit 114 performs, in each frame, positioning of the cut-out regions Ra and Rb that have been projectively transformed in the projective transformation unit 113 to obtain positional shift amounts and reliability of the positional shift amounts. Positioning is performed by, for example, a method using block matching or a method using feature matching. The positional shift amounts indicate shifts between the moving image Va and the moving image Vb obtained as a result of positioning and are denoted by, for example, vectors or projection matrixes.

The reliability of the positional shift amounts is, for example, a value indicating a degree of spatial deviation of features obtained when vectors, projection matrixes, or the like are calculated or a degree of variation in local vectors in a frame. The reliability indicates a higher value when, for example, features can be detected without spatial deviation, a result obtained by projectively transforming the moving image Va and obtaining a difference between the moving image Va and the moving image Vb is small (the moving image Va and the moving image Vb may be replaced with each other), or local vectors having similar directions/magnitudes can be detected as a whole.

The positional shift stabilization unit 115 calculates L ($1 \leq L \leq M$) stabilized positional shift amounts on the basis of positional shift amounts calculated in a predetermined number of frames, e.g., positional shift amounts of M frames. Stabilization is performed by, for example, a method in which an average (or a weighted average) of the positional shift amounts of the M frames is taken, a method in which positional shift amounts that are largely deviated from the M positional shift amounts are excluded and then an average (or a weighted average) is taken, or a method in which the positional shift amounts of the M frames are classified into classes on the basis of an arbitrary criterion, an arbitrary class is selected, and an average (or a weighted average) of positional shift amounts in the class is taken. At this time, the reliability of the positional shift amounts may be used for performing exclusion and weighting.

As described above, in the case where each moving image includes N frames, the frame selection unit 117 selects M frames whose positional shift amounts are to be calculated. For example, the frame selection unit 117 selects appropriate M frames in terms of a positional-shift-amount calculation performance on the basis of scores calculated in the score calculation unit 116, i.e., extracts M frames in favorable order and excludes unfavorable frames. Further, for example, the frame selection unit 117 selects M frames on the basis of a user's setting operation.

As determination criteria of frame selection in the frame selection unit 117, for example, any one or a plurality of the following points are included.

(1) A frame that does not include a close subject
(2) A frame that is not obtained by irregular camerawork
(3) A frame having a small blur/defocus
(4) A frame having a reliable positional shift amount
(5) A frame whose positional shift amount is not largely deviated from positional shift amounts of other frames
(6) A frame having a positional shift amount that belongs to an arbitrary class as a result of class classification
(7) M arbitrary consecutive frames
(8) M frames having arbitrary intervals (unchangeable, changeable)

For the above determination criteria, for example, a moving image output from the projective transformation unit 113, information on a positional shift amount and reliability calculated in the positional-shift-amount calculation unit 114, sensor information, and control information indicating irregular camerawork and the like are supplied to the score calculation unit 116. Further, for example, not only scores calculated in the score calculation unit 116 but also information set by a user, such as the number of frames to be selected, an interval between frames to be selected, the first and last sections to be excluded, and classes, is supplied to the frame selection unit 117.

The score calculation unit 116 calculates a score in each frame regarding, for example, (1) to (5), and the frame selection unit 117 selects M frames on the basis of the calculated scores.

Figure 5:
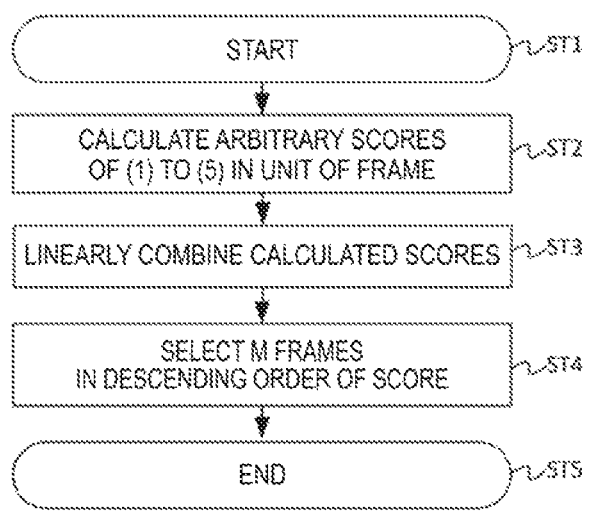
FIG. 5 is a flowchart showing an example of processing in a score calculation unit and a frame selection unit.

A flowchart in FIG. 5 shows an example of processing in the score calculation unit 116 and the frame selection unit 117. In Step ST1, the processing is started. In Step ST2, one or a plurality of arbitrary scores in (1) to (5) are calculated in the unit of frame. In Step ST3, in the case where a plurality of scores are calculated, the scores are linearly combined. Herein, linear combination means, for example, combination using an average, a weighted average, or the like. In Step ST4, M frames are selected in descending order of score. In Step ST5, the processing is terminated.

The individual determination criteria will be further described.

"(1) A frame that does not include a close subject"

Figure 6:
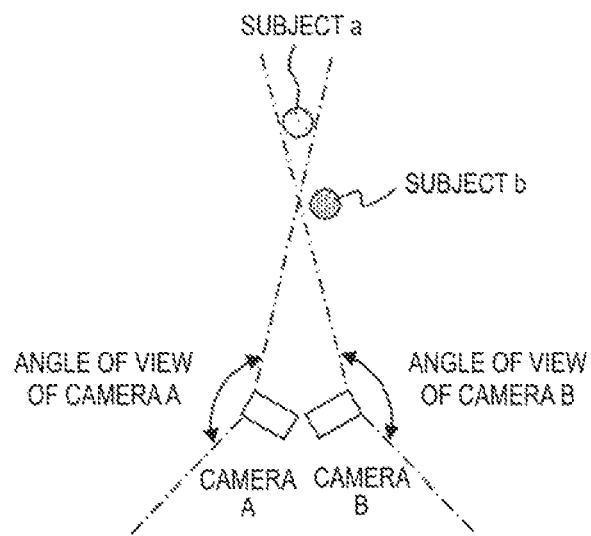
FIG. 6 shows a state in which a close subject exists when two moving images are captured by two cameras A and B.

When moving images are captured by a plurality of cameras and a close subject exists between the cameras, different images exist in the captured moving images, and therefore it is difficult to calculate a positional shift amount. FIG. 6(*a*) shows a state in which a close subject exists when the two moving images Va and Vb are captured by the two cameras A and B. A subject b is included in an angle of view of the camera B but is not included in an angle of view of the camera A.

Figure 7:
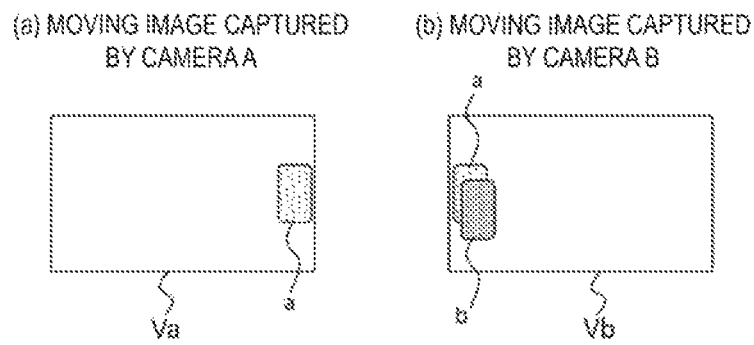
FIG. 7 shows examples of moving images Va and Vb captured when a close subject exists.

Thus, the captured moving images Va and Vb are as shown in FIG. 7. In this case, the subject b exists only in the moving image Vb. Further, most part of a subject a existing in the moving image Va and the moving image Vb in common is obstructed by the subject b in the moving image Vb. When the close subject occupies most of an overlapping region as described above, it is difficult to perform positioning of the moving image Va and the moving image Vb.

Therefore, it is desirable to exclude a frame in which the close subject exists from targets to be subjected to positional-shift-amount calculation. For example, a case where a person passes a camera is a typical example. Detection of the close subject can be achieved by, for example, using sensor information of a camera obtained when a moving image is captured, using a difference or correlation between left and right moving images, or using a recognition technique. Based on a result of the detection, for example, the score calculation unit 116 reduces a score as a ratio of the close subject is higher.

"(2) A frame that is not obtained by irregular camerawork"

A camera may be fixed or moved at the time of capturing a moving image. However, in the case where continuous camerawork is not performed, i.e., the camera suddenly moves or is greatly shaken, an image different from images before and after the corresponding frame appears in an angle of view of the camera. Therefore, a peculiar positional shift amount is generated and it is difficult to stabilize positional shift amounts in some cases.

Thus, it is desirable to exclude a frame obtained by irregular camerawork. Detection of irregular camerawork may be performed by recording sensor information of a gyrosensor or the like of a camera or can be achieved by performing image processing to check a change of motion vectors or statistics of images. Based on a result of the detection, for example, the score calculation unit 116 reduces a score as a change between a frame and frames therebefore/thereafter or peripheral frames in an arbitrary period is greater.

"(3) A frame having a small blur/defocus"

When an image is defocused due to a blur caused by camera shake, a blur caused by motion of a subject, out-of-focus, and the like, it is difficult to calculate a positional shift amount in some cases. Therefore, it is desirable to exclude such a frame from targets to be subjected to positional-shift-amount calculation. Camera shake can be detected on the basis of, for example, information of a sensor, such as a gyrosensor, obtained when an image is captured by a camera. Out-of-focus can be detected on the basis of, for example, information of a sensor obtained when an image is captured by a camera or information on focus control.

It is possible to calculate to what degree defocusing is generated as a result on the basis of a captured image in common to a blur caused by camera shake, a blur caused by motion of a subject, out-of-focus, and the like. For example, generation of defocusing can be checked on the basis of presence/absence of a high-frequency component of a signal. The score calculation unit 116 detects a blur/defocus on the basis of such information and reduces a score as the blur/defocus is larger.

"(4) A frame having a reliable positional shift amount"

Reliability of a positional shift amount is a value calculated in the positional-shift-amount calculation unit 114. The score calculation unit 116 increases a score as this value is larger. For example, the positional-shift-amount calculation unit 114 calculates a projection matrix for performing fitting of patterns in two images and further analyzes this projection matrix, thereby obtaining a positional shift amount, and converts an error of this fitting into a weight to define the reliability.

"(5) A frame whose positional shift amount is not largely deviated from positional shift amounts of other frames"

In the case where a positional shift amount of a target frame, which is output by the positional-shift-amount calculation unit 114, is largely deviated from positional shift amounts of other frames, there is a possibility that the positional shift amount in the frame is not correctly calculated. Therefore, it is desirable to exclude the frame. A degree of deviation of a positional shift amount from positional shift amounts in other frames may be obtained by performing differentiation between frames or can be quantified by, for example, a difference absolute value or a square of a difference from a total or local average. The score calculation unit 116 reduces a score as the degree of deviation is higher.

"(6) A frame having a positional shift amount that belongs to an arbitrary class as a result of class classification"

The frame selection unit 117 performs class classification on the basis of an arbitrary criterion, selects an arbitrary class from a plurality of classified classes, and selects M frames therefrom. In this case, information on a class to be finally selected is supplied by, for example, a user.

The criterion of the class classification is, for example, classifying frames having similar positional shift amounts among frames into the same class. Selection of an arbitrary class is, for example, selecting a class having the largest number of frames. Note that a method of selecting M frames from the selected class is, for example, a method using the above scores.

Figure 8:
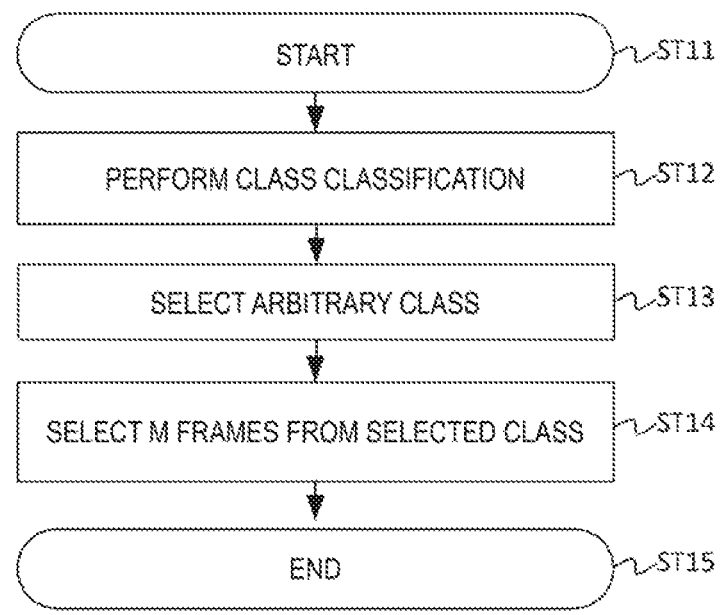
FIG. 8 is a flowchart showing an example of processing in the frame selection unit.

A flowchart in FIG. 8 shows an example of processing in the frame selection unit 117. In Step ST11, the processing is started. In Step ST12, class classification is performed. In Step ST13, an arbitrary class is selected. In Step ST14, M frames are selected from the selected class. In Step ST15, the processing is terminated.

"(7) M arbitrary consecutive frames"

The frame selection unit 117 selects M arbitrary consecutive frames. For example, the frame selection unit 117 calculates arbitrary scores of (1) to (5) in each frame, adds up scores of M consecutive frames, and selects a section (M frames) having the highest score. Alternatively, the frame selection unit 117 selects a section of M consecutive frames specified by a user.

"(8) M frames having arbitrary intervals (unchangeable, changeable)"

The frame selection unit 117 selects M frames having arbitrary intervals (unchangeable, changeable). For example, the frame selection unit 117 calculates arbitrary scores of (1) to (5) at arbitrary intervals in each frame, adds up scores of M frames, and selects an interval having the highest score. The intervals may be fixed or changed. Alternatively, a user may specify intervals.

In the configuration example in FIG. 3, the processing is performed in the following order: partial cutting-out; distortion correction; projective transformation; and calculation of a positional shift amount. However, the processing does not necessarily need to be performed in the above order. For example, it is also considered that distortion correction and projective transformation are performed and then partial cutting-out is performed. Further, there is the case where M frames are selected and then positional shift amounts of the M frames are calculated and the case where positional shift amounts are calculated in all frames and then the M frames are selected.

The distortion correction unit 121, as well as the above distortion correction unit 112, corrects distortion of the moving images Va and Vb. The projective transformation unit 122, as well as the projective transformation unit 113, projectively transforms the moving images Va and Vb whose distortion has been corrected. The panorama combination unit 123 combines the moving image Va and the moving image Vb on the basis of the L (1≤L≤M) stabilized positional shift amounts obtained in the positional-shift-amount stabilization unit 115, thereby generating a panoramic moving image PV.

For example, in the case of L=1, a single positional shift amount is applied to combining all frames. Meanwhile, for example, in the case of L>1, a frame having no positional shift amount is interpolated so that the positional shift amount is gently changed (except for a scene change). Stitching processing of images (combination processing of overlapping regions) is performed by, for example, blending the moving image Va and the moving image Vb or using any one of the moving images.

Figure 9:
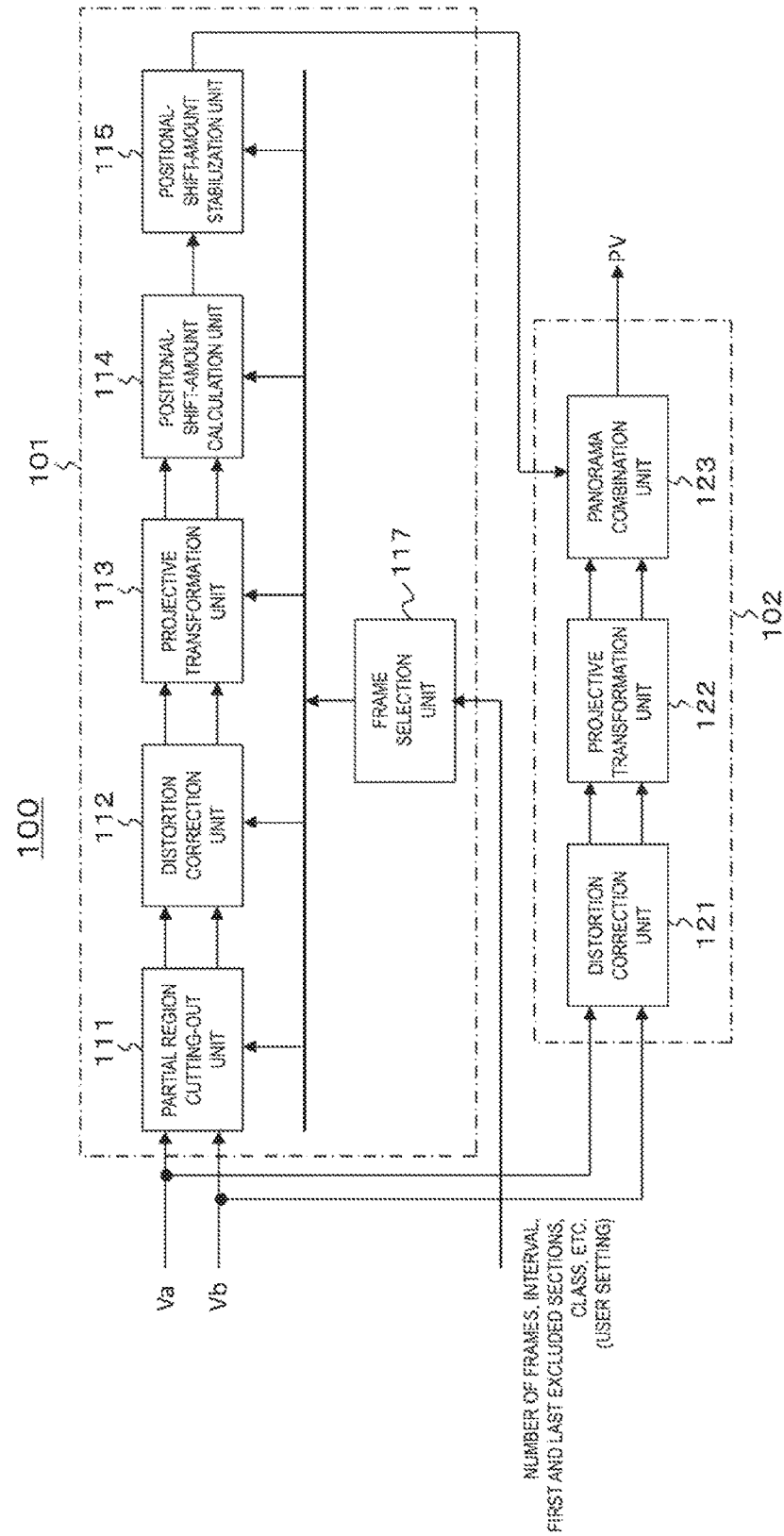
FIG. 9 is a block diagram showing another example of the specific configurations of the positional-shift-amount acquisition unit and the image combination unit of the panoramic moving image generation device.

FIG. 9 shows another example of the specific configurations of the positional-shift-amount acquisition unit 101 and the image combination unit 102 of the panoramic moving image generation device 100. In FIG. 9, parts corresponding to the parts in FIG. 3 are denoted by the same reference signs, and detailed description thereof is omitted. FIG. 9 shows an example where the positional-shift-amount acquisition unit 101 does not include the score calculation unit 116. In this example, determination criteria of frame selection in the frame selection unit 117 are, for example, (6) to (8). Other configurations are the same as the configurations in FIG. 3.

Figure 10:
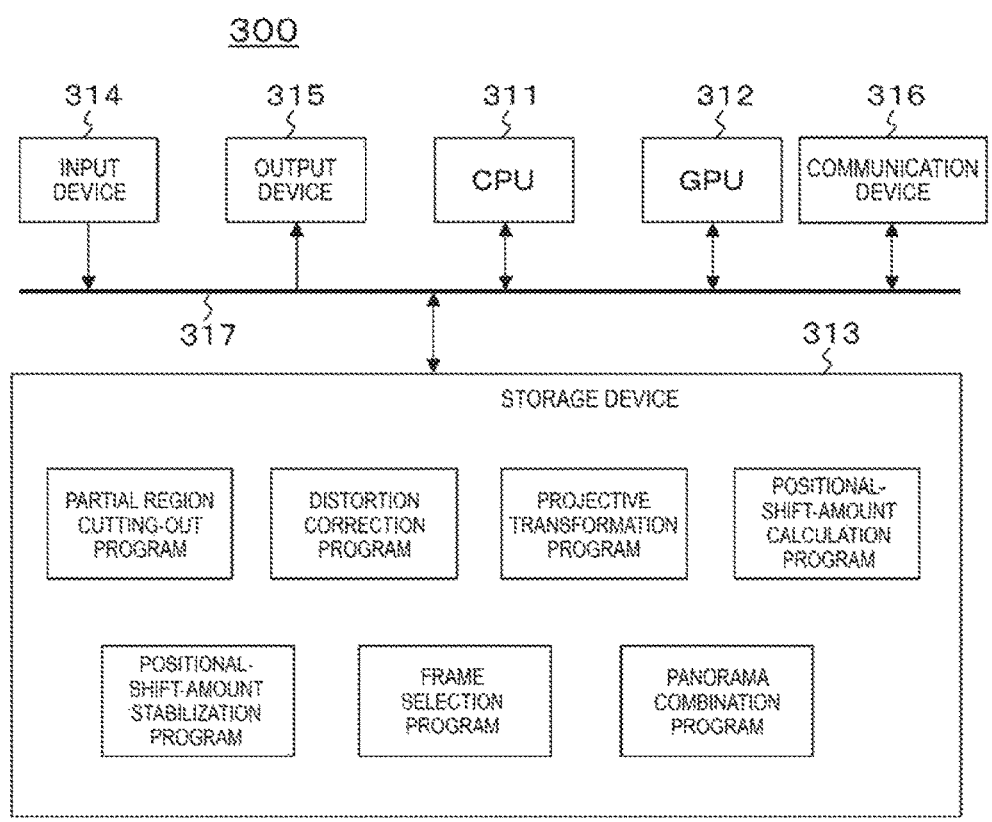
FIG. 10 shows an example of a computer used when the panoramic moving image generation device is configured by software.

Note that the panoramic moving image generation device 100 (see FIG. 3 and FIG. 9) can be configured by hardware and can also be configured by software. For example, the panoramic moving image generation device can be realized by executing programs in a general computer (including a mobile device, a device connected via a network, and a cloud) 300 shown in FIG. 10.

The computer 300 is configured by connecting a central processing unit (CPU) 311, a graphics processing unit (GPU) 312, a storage device 313, an input device 314, an output device 315, and a communication device 316 to a bus 317. The input device 314 includes a keyboard, a mouse, a microphone, and the like. The output device 315 includes a display, a speaker, and the like.

The storage device 313 includes a hard disk drive (HDD), a nonvolatile memory, and the like. The storage device 313 stores a partial region cutting-out program, a distortion correction program, a projective transformation program, a positional-shift-amount calculation program, a positional-shift-amount stabilization program, a frame selection program, a panorama combination program, and the like. The computer 300 can implement an arbitrary combination of the programs.

Figure 11:
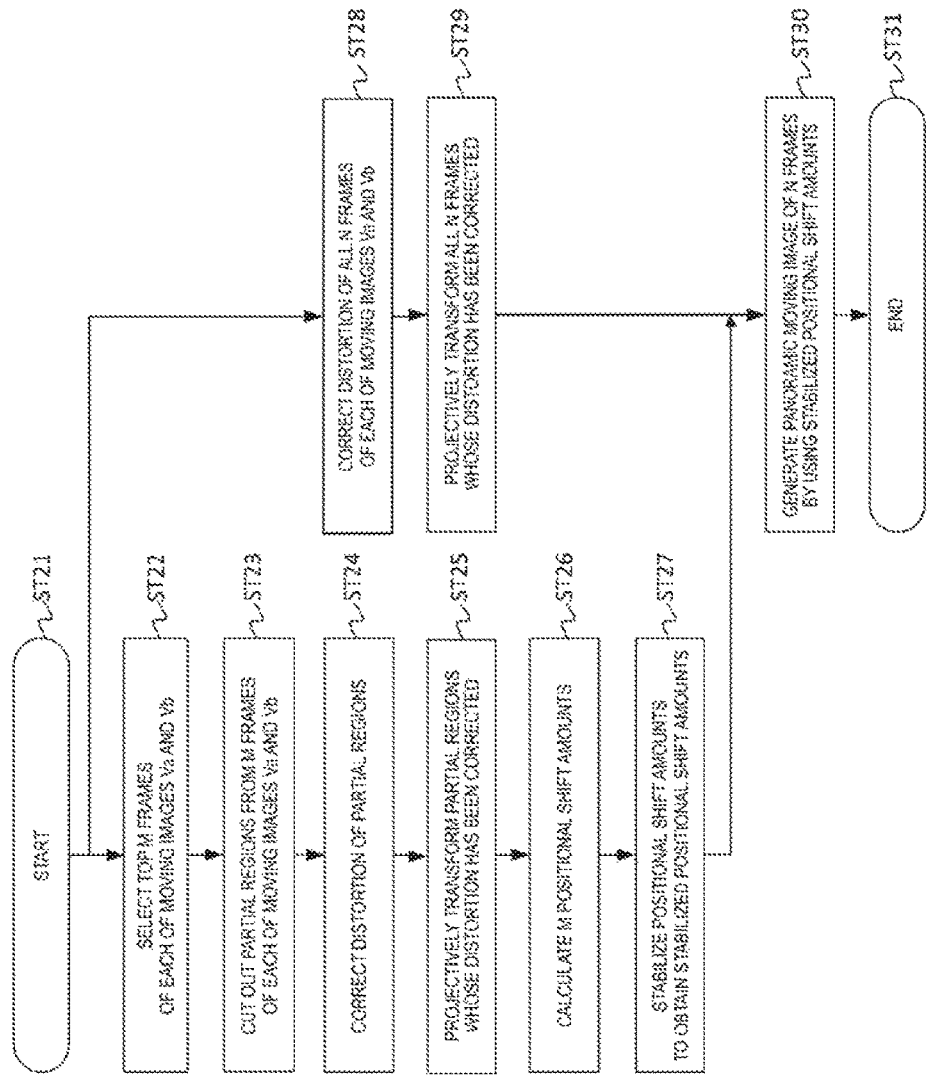
FIG. 11 is a flowchart showing an example of panoramic image generation processing in a computer.

A flowchart in FIG. 11 shows an example of panoramic image generation processing in the computer 300. In this processing example, positional shift amounts are calculated by using M frames from the top, and the positional shift amounts are stabilized, then a panoramic moving image is generated, and the above point (7) is used as a determination criterion of frame selection. Note that distortion correction and projective transformation are implemented as necessary (may not be implemented if not necessary).

In Step ST21, the computer 300 starts the processing. Thereafter, in Step ST22, the computer 300 selects the top M frames of each of the moving images Va and Vb. In this case, a first certain section may be excluded because the first certain section is considered to be an unstable section.

In Step ST23, the computer 300 cuts out partial regions Ra and Rb from the M frames of each of the moving images Va and Vb (see FIG. 4). In Step ST24, the computer 300 corrects distortion of the partial regions Ra and Rb. In Step ST25, the computer 300 projectively transforms the partial regions Ra and Rb whose distortion has been corrected.

In Step ST26, the computer 300 calculates positional shift amounts of the M frames selected in Step ST22. Herein, the computer 300 detects feature values with the use of an algorithm for obtaining a feature value in a region, such as Scale Invariant Feature Transform (SIFT), Speed-Up Robust Features (SURF), Binary Robust Invariant Scalable Keypoints (BRISK), Histogram of Oriented Gradients (HOG), or Local Binary Pattern (LBP). Then, the computer 300 performs matching processing using the detected feature values to calculate positional shift amounts between the partial regions Ra and Rb. In Step ST27, the computer 300 stabilizes the positional shift amounts to obtain L (1≤L≤M) stabilized positional shift amounts.

After the processing is started in Step ST21, in Step ST28, the computer 300 corrects distortion of all N frames of each of the moving images Va and Vb. In Step ST29, the computer 300 projectively transforms all the N frames whose distortion has been corrected.

In Step ST30, the computer 300 combines the N frames of the moving image Va and the N frames of the moving image Vb obtained in Step ST29, respectively, while referring to the stabilized positional shift amounts, thereby generating a panoramic moving image PV of the N frames. After Step ST30, in Step ST31, the computer 300 terminates the processing.

Figure 12:
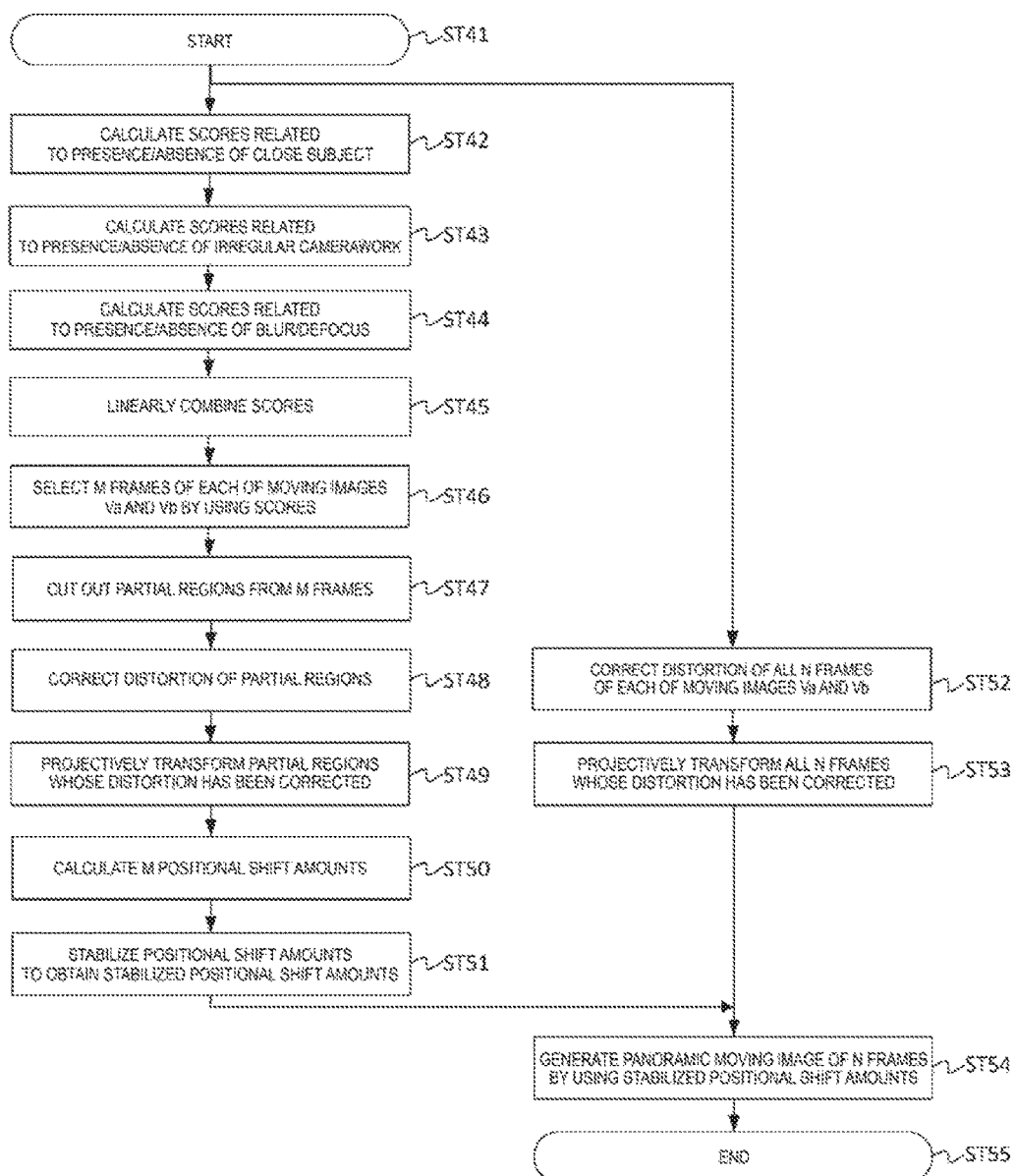
FIG. 12 is a flowchart showing another example of the panoramic image generation processing in a computer.

A flowchart in FIG. 12 shows another example of the panoramic image generation processing in the computer 300. In this processing example, M frames are selected on the basis of presence/absence of a close subject, presence/absence of irregular camerawork, and presence/absence of a blur/defocus, and positional shift amounts are calculated with the use of the M frames to stabilize the positional shift amounts, then a panoramic moving image is generated, and (1) to (3) are used as determination criteria of frame selection. Note that scores (1) to (3) may be calculated in parallel. Distortion correction and projective transformation are implemented as necessary (may not be implemented if not necessary).

In Step ST41, the computer 300 starts the processing. Thereafter, in Step ST42, the computer 300 calculates scores related to presence/absence of a close subject. In Step ST43, the computer 300 calculates scores related to presence/absence of irregular camerawork. In Step ST44, the computer 300 calculates scores related to presence/absence of a blur/defocus. In Step ST45, the computer 300 linearly combines the scores.

In Step ST46, the computer 300 selects M frames of each of the moving images Va and Vb with the use of the scores obtained in Step ST45. In Step ST47, the computer 300 cuts out the partial regions Ra and Rb from the selected M frames (see FIG. 4). In Step ST48, the computer 300 corrects distortion of the partial regions Ra and Rb. In Step ST49, the computer 300 projectively transforms the partial regions Ra and Rb whose distortion has been corrected.

In Step ST50, the computer 300 calculates M positional shift amounts. Herein, the computer 300 detects feature values with the use of an algorithm for obtaining a feature value in a region, such as SIFT, SURF, BRISK, HOG, or LBP. Then, the computer 300 performs matching processing using the detected feature values to calculate positional shift amounts between the partial regions Ra and Rb. In Step ST51, the computer 300 stabilizes the positional shift amounts to obtain L (1≤L≤M) stabilized positional shift amounts.

After the processing is started in Step ST41, in Step ST52, the computer 300 corrects distortion of all N frames of each of the moving images Va and Vb. In Step ST53, the computer 300 projectively transforms all the N frames whose distortion has been corrected.

In Step ST54, the computer 300 combines the N frames of the moving image Va and the N frames of the moving image Vb obtained in Step ST53, respectively, while referring to the stabilized positional shift amounts, thereby generating a panoramic moving image PV of the N frames. After Step ST54, in Step ST55, the computer 300 terminates the processing.

Figure 13:
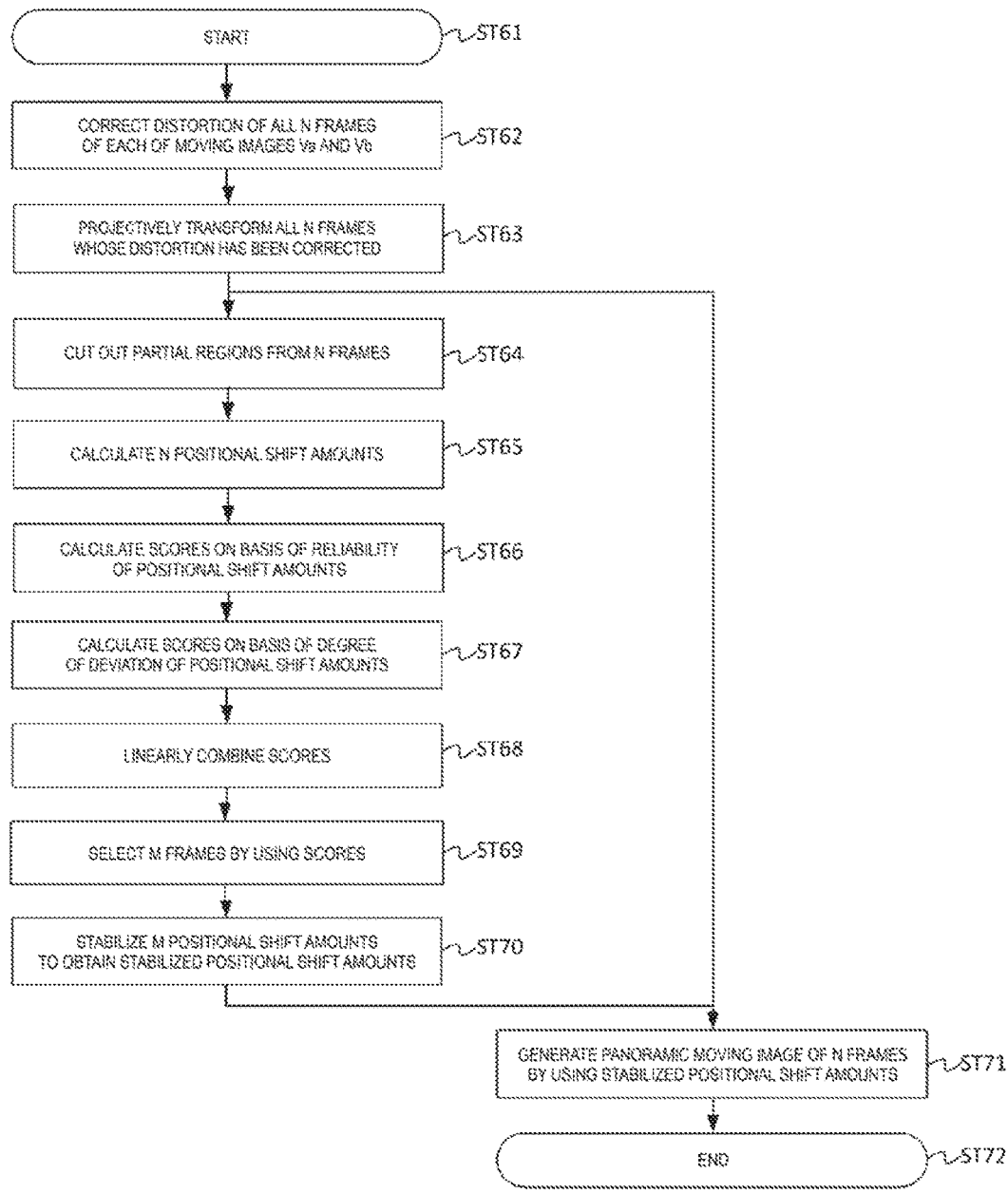
FIG. 13 is a flowchart showing another example of the panoramic image generation processing in a computer.

A flowchart in FIG. 13 shows another example of the panoramic image generation processing in the computer 300. In this processing example, positional shift amounts are calculated, and M frames are selected on the basis of reliability of the positional shift amounts and the degree of deviation thereof to stabilize the positional shift amounts, then a panoramic moving image is generated, and the above points (4) and (5) are used as determination criteria of frame selection. Note that scores of (4) and (5) may be calculated in parallel. Distortion correction and projective transformation are implemented as necessary (may not be implemented if not necessary).

In Step ST61, the computer 300 starts the processing. Thereafter, in Step ST62, the computer 300 corrects distortion of all N frames of each of the moving images Va and Vb. In Step ST63, the computer 300 projectively transforms all the N frames whose distortion has been corrected.

In Step ST64, the computer 300 cuts out the partial regions Ra and Rb from the N frames (see FIG. 4). In Step ST65, the computer 300 calculates positional shift amounts of the N frames. Herein, the computer 300 detects feature values with the use of an algorithm for obtaining a feature value in a region, such as SIFT, SURF, BRISK, HOG, or LBP. Then, the computer 300 performs matching processing using the detected feature values to calculate positional shift amounts between the partial regions Ra and Rb.

In Step ST66, the computer 300 calculates scores on the basis of the reliability of the positional shift amounts. In Step ST67, the computer 300 calculates scores on the basis of the degree of deviation of the positional shift amounts. In Step ST68, the computer 300 linearly combines the scores.

In Step ST69, the computer 300 selects M frames with the use of the scores obtained in Step ST68. In Step ST70, the computer 300 stabilizes M positional shift amounts of the selected M frames to obtain L (1≤L≤M) stabilized positional shift amounts.

In Step ST71, the computer 300 combines the N frames of the moving image Va and the N frames of the moving image Vb obtained in Step ST63, respectively, while referring to the stabilized positional shift amounts, thereby generating a panoramic moving image PV of the N frames. After Step ST71, in Step ST72, the computer 300 terminates the processing.

Figure 14:
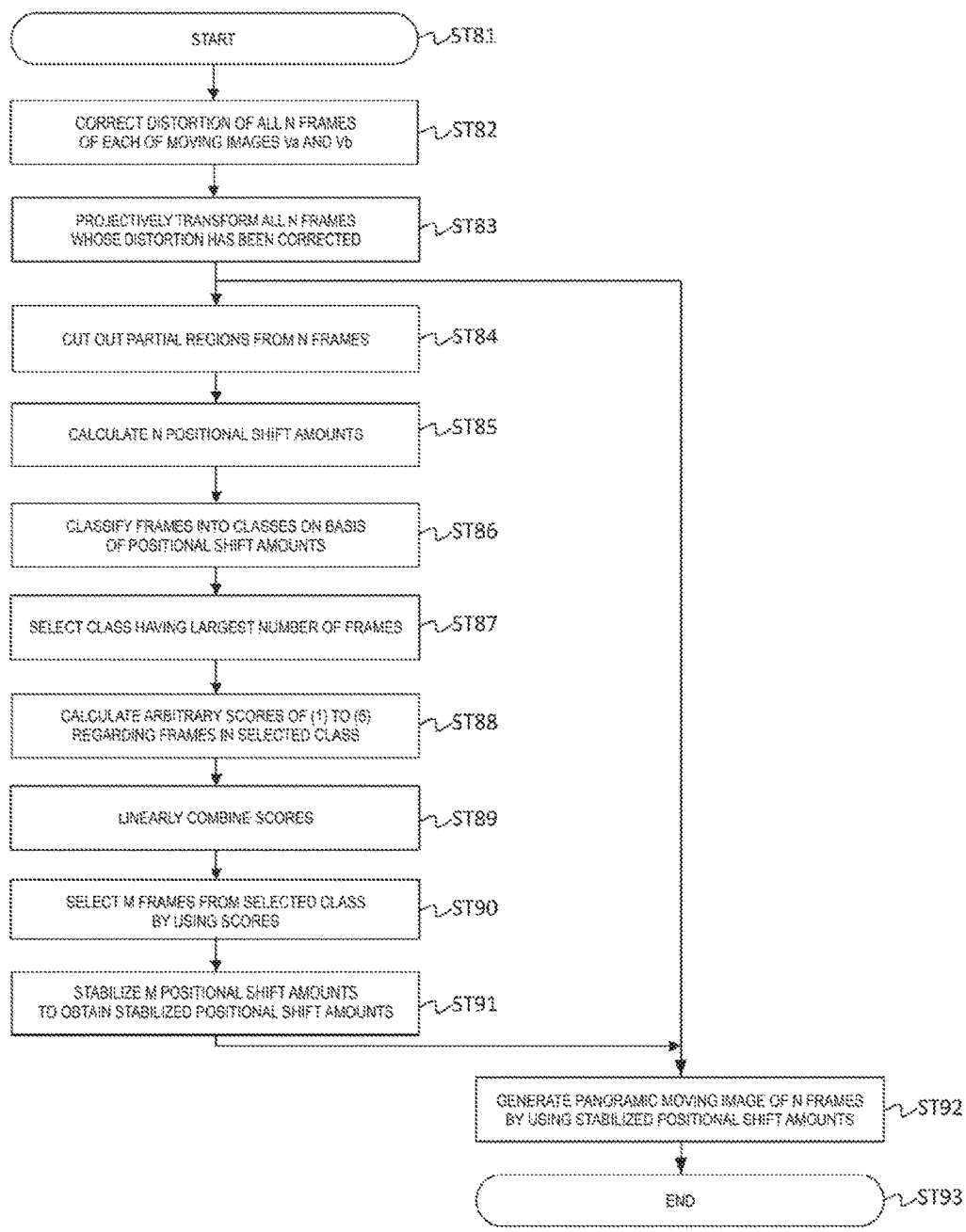
FIG. 14 is a flowchart showing another example of the panoramic image generation processing in a computer.

A flowchart in FIG. 14 shows another example of the panoramic image generation processing in the computer 300. In this processing example, positional shift amounts are calculated and frames are classified into classes on the basis of the positional shift amounts, and a class is selected and M frames are selected, then the positional shift amounts are stabilized, and the above point (6) is used as a determination criterion of frame selection. Note that arbitrary scores of (1) to (5) calculated in the point (6) may be calculated in parallel. Distortion correction and projective transformation are implemented as necessary (may not be implemented if not necessary).

In Step ST81, the computer 300 starts the processing. Thereafter, in Step ST82, the computer 300 corrects distortion of all N frames of each of the moving images Va and Vb. In Step ST83, the computer 300 projectively transforms all the N frames whose distortion has been corrected.

In Step ST84, the computer 300 cuts out the partial regions Ra and Rb from the N frames (see FIG. 4). In Step ST85, the computer 300 calculates positional shift amounts of the N frames. Herein, the computer 300 detects feature values with the use of an algorithm for obtaining a feature value in a region, such as SIFT, SURF, BRISK, HOG, or LBP. Then, the computer 300 performs matching processing using the detected feature values to calculate positional shift amounts between the partial regions Ra and Rb.

In Step ST86, the computer 300 classifies the frames into classes on the basis of the positional shift amounts. In Step ST87, the computer 300 selects a class having the largest number of frames. In Step ST88, regarding the frames in the selected class, the computer 300 calculates arbitrary scores of (1) to (5). In Step ST89, the computer 300 linearly combines the scores.

In Step ST90, the computer 300 selects M frames with the use of the scores obtained in Step ST89. In Step ST91, the computer 300 stabilizes M positional shift amounts of the selected M frames to obtain L (1≤L≤M) stabilized positional shift amounts.

In Step ST92, the computer 300 combines the N frames of the moving image Va and the N frames of the moving image Vb obtained in Step ST83, respectively, while referring to the stabilized positional shift amounts, thereby generating a panoramic moving image PV of the N frames. After Step ST92, in Step ST93, the computer 300 terminates the processing.

The panoramic image generation processing in the computer 300, which is shown in the flowcharts in FIGS. 11 to 14, is merely examples, and panoramic image generation processing is not limited thereto. Note that, when scores are calculated earlier, the following can be said in common to all processing.

(1) N frames can be reduced to M frames early (reduction in calculation amount)

(2) Accuracy of usable information is low (no distortion correction, no projective transformation, no positional shift amount, no reliability, and the like)

As described above, the panoramic moving image generation device 100 shown in FIG. 1 acquires positional shift amounts of M frames selected from N frames and generates a panoramic moving image PV of the N frames on the basis of the positional shift amounts of the M frames. Thus, for example, only accurate positional shift amounts can be acquired as the positional shift amounts, and therefore a high-quality panoramic moving image can be generated. Further, for example, a calculation cost for obtaining a positional shift amount can be reduced.

2. Second Embodiment

[Configuration Example of Panoramic Moving Image Generation Device]

Figure 15:
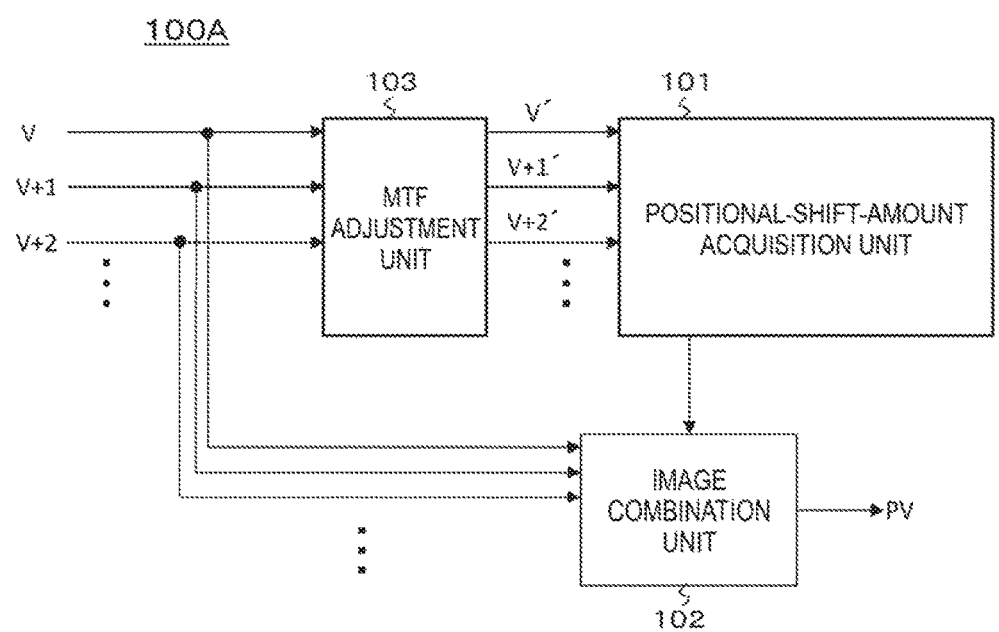
FIG. 15 is a block diagram showing a configuration example of a panoramic moving image generation device according to a second embodiment.

FIG. 15 shows a configuration example of a panoramic moving image generation device 100A according to a second embodiment. In FIG. 15, parts corresponding to the parts in FIG. 1 are denoted by the same reference signs, and detailed description thereof is omitted as appropriate. The panoramic moving image generation device 100A includes the positional-shift-amount acquisition unit 101, the image combination unit 102, and an MTF adjustment unit 103.

The MTF adjustment unit 103 makes adjustment for matching spatial frequency characteristics of moving images v, v+1, v+2, v+3, . . . . The MTF adjustment unit 103 performs filtering using a low-pass filter or a band-pass filter to match the spatial frequency characteristics of the respective moving images. In this case, a filter characteristic may be fixed or may be adaptively changed in accordance with the spatial frequency characteristics of the respective moving images.

In the case where the filter characteristic is changed, the MTF adjustment unit 103 performs, for example, Fourier transform processing to detect the spatial frequency characteristics of the respective moving images. Then, the MTF adjustment unit 103 changes the filter characteristic so that the spatial frequency characteristics of the respective moving images are restricted to a spatial frequency characteristic obtained on the basis of a result of detection of the spatial frequency characteristics of the respective moving images, e.g., a spatial frequency characteristic having the highest spatial frequency which all the moving images have in common. That is, the MTF adjustment unit 103 changes a cutoff frequency of the low-pass filter as the filter characteristic to restrict the spatial characteristics of the respective moving images v, v+1, v+2, v+3, . . . to a spatial frequency characteristic having the highest spatial frequency which both have in common. Note that cutoff frequencies for the moving images v, v+1, v+2, v+3, . . . are the same. The MTF adjustment unit 103 only needs to match the spatial frequency characteristics of the moving images v, v+1, v+2, v+3, . . . and may perform filtering on the moving images v, v+1, v+2, v+3, . . . with the use of a low-pass filter having a fixed cutoff frequency.

The positional-shift-amount acquisition unit 101 acquires positional shift amounts with the use of moving images v', v+1', v+2', v+3', . . . whose spatial frequency characteristics have been adjusted in the MTF adjustment unit 103. The image combination unit 102 performs positioning on every two adjacent moving images while referring to the positional shift amounts of a predetermined number of frames acquired in the positional-shift-amount acquisition unit 101 and combines the moving images, thereby generating a panoramic moving image PV. Although detailed description is omitted, processing in the positional-shift-amount acquisition unit 101 and the image combination unit 102 is similar to the processing in the panoramic moving image generation device 100 shown in FIG. 1.

As described above, in the panoramic moving image generation device 100A shown in FIG. 15, the moving images v, v+1, v+2, v+3, . . . are not directly supplied to the positional-shift-amount acquisition unit 101, but the moving images v', v+1', v+2', v+3', . . . whose spatial frequency characteristics have been matched are supplied thereto. Therefore, when a positional shift amount is acquired, it is possible to improve an acquisition performance of a positional shift amount between overlapping regions in two adjacent images by detecting feature values.

Figure 16:
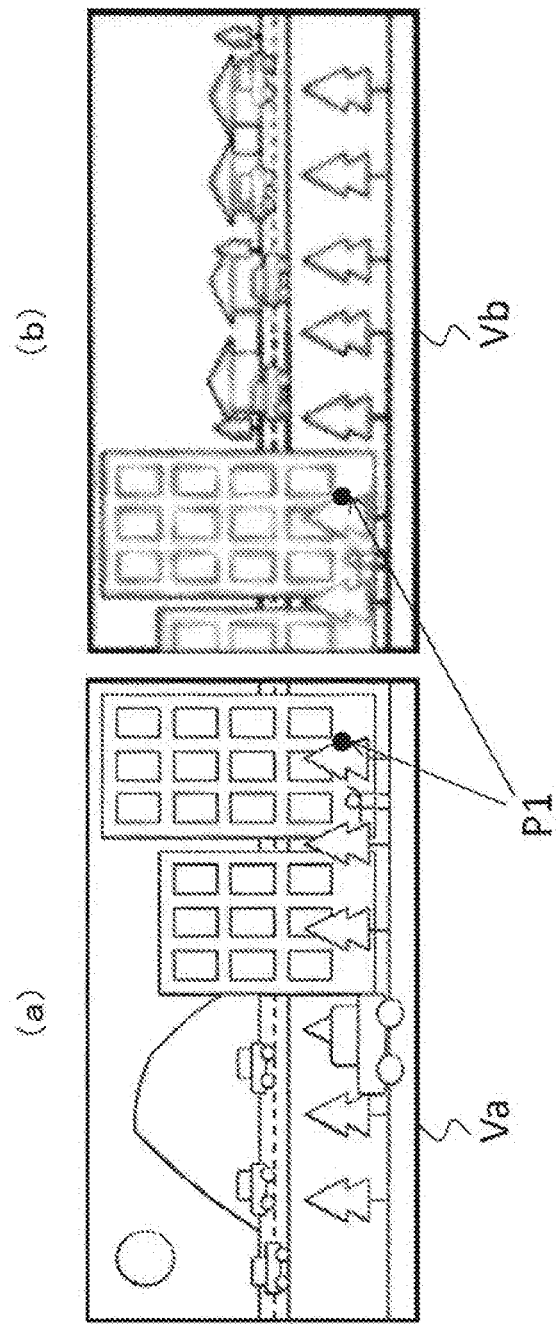
FIG. 16 shows examples of two images Va and Vb captured by a first camera and a second camera adjacent to each other.
Figure 17:
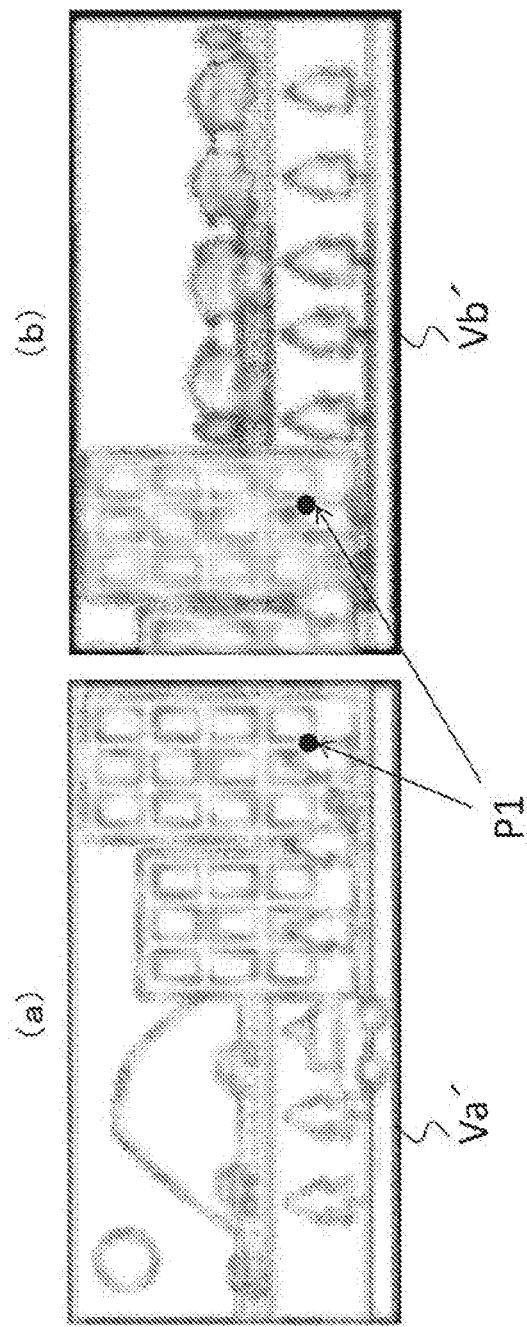
FIG. 17 shows examples of two images Va and Vb whose spatial frequency characteristics have been matched.

FIGS. 16(a) and (b) show examples of two images Va and Vb captured by a first camera and a second camera adjacent to each other. In this example, spatial frequency characteristics (MTF) of the two images are different from each other due to a difference in lens and focus between the first camera and the second camera. In this case, it is highly possible that feature values are not detected at the same position P1 due to a difference in spatial frequency characteristic. On the contrary, FIGS. 17(a) and (b) show examples of two images Va' and Vb' whose spatial frequency characteristics have been matched. In this case, it is highly possible that feature values are detected at the same position P1.

Therefore, in the panoramic moving image generation device 100A shown in FIG. 15, it is possible to improve an acquisition performance of a positional shift amount in the positional-shift-amount calculation unit 101 even in the case where cameras are different in lens and focus. Therefore, the panoramic moving image generation device 100A can favorably combine the moving images v, v+1, v+2, v+3, . . . and can obtain a high-quality panoramic moving image PV.

3. Modification Example

Note that, although description has not been provided in the above description, it is also considered that the panoramic moving image generation device 100 or 100A shown in FIG. 1 or FIG. 15 is mounted on a camera, a portable terminal having a camera function, or the like. However, the panoramic moving image generation device 100 or 100A can also be mounted on a computer (server) on a network or cloud. In this case, the camera or the portable terminal having a camera function transmits a captured moving image to the computer (server) on the network or cloud and receives a panoramic moving image that is a result thereof. This makes it possible to reduce a processing load of the camera or the portable terminal having a camera function.

Additionally, the present technology may also be configured as below.

(1)

An image processing device, including:

a positional-shift-amount acquisition unit configured to include a frame selection unit configured to select a first moving image and a second moving image, each of which has a predetermined number of frames, from a first moving image and a second moving image, each of which has a plurality of frames captured by a camera, and acquire positional shift amounts of the predetermined number of frames from the first moving image and the second moving image, each of which has the predetermined number of frames selected in the frame selection unit.

(2)

The image processing device according to (1), wherein the frame selection unit selects the predetermined number of frames on the basis of sensor output and/or image processing results.

(3)

The image processing device according to (1) or (2), wherein the frame selection unit selects, as the predetermined number of frames, a frame having a small number of close subjects.

(4)

The image processing device according to any of (1) to (3), wherein the frame selection unit selects, as the predetermined number of frames, a frame that is not obtained by irregular camerawork.

(5)

The image processing device according to any of (1) to (4), wherein the frame selection unit selects, as the predetermined number of frames, a frame having a large number of high frequency components.

(6)

The image processing device according to any of (1) to (5), wherein the frame selection unit selects, as the predetermined number of frames, a frame having high reliability.

(7)

The image processing device according to any of (1) to (6), wherein the frame selection unit selects, as the predetermined number of frames, frames having close positional shift amounts.

(8)

The image processing device according to any of (1) to (7), wherein the frame selection unit classifies the positional shift amounts into classes and selects, as the predetermined number of frames, a frame having positional shift amounts belonging to a predetermined class.

(9)

The image processing device according to any of (1) to (8), wherein the frame selection unit selects, as the predetermined number of frames, arbitrary consecutive frames.

(10)

The image processing device according to any claims 1 of (1) to (8), wherein the frame selection unit selects, as the predetermined number of frames, frames having an arbitrary interval.

(11)

The image processing device according to any of (1) to (10), wherein the frame selection unit does not select, as the predetermined number of frames, frames in first and/or last certain periods.

(12)

The image processing device according to any of (1) to (11), further including:

an image combination unit configured to combine the first moving image and the second moving image on the basis of the positional shift amounts of the predetermined number of frames to obtain a panoramic moving image.

(13)

The image processing device according to (12), wherein, when the predetermined number of frames is a plurality of frames, the image combination unit obtains one or a plurality of positional shift amounts on the basis of the predetermined number of positional shift amounts and uses the one or plurality of positional shift amounts.

(14)

The image processing device according to any of (1) to (15), wherein the positional-shift-amount acquisition unit obtains the positional shift amounts after processing for matching spatial frequencies of the first moving image and the second moving image is performed.

(15)

An image processing method, including:

a frame selection step of selecting a first moving image and a second moving image, each of which has a predetermined number of frames, from a first moving image and a second moving image, each of which has a plurality of frames captured by a camera; and a positional-shift-amount acquisition step of acquiring positional shift amounts of the predetermined number of frames from the first moving image and the second moving image, each of which has the predetermined number of frames selected in the frame selection step.

(16)

A program for causing a computer to function as:

frame selection means for selecting a first moving image and a second moving image, each of which has a predetermined number of frames, from a first moving image and a second moving image, each of which has a plurality of frames captured by a camera; and positional-shift-amount acquisition means for acquiring positional shift amounts of the predetermined number of frames from the first moving image and the second moving image, each of which has the predetermined number of frames selected in the frame selection means.

REFERENCE SIGNS LIST

100, 100A panoramic moving image generation device
101 positional-shift-amount acquisition unit
102 image combination unit
103 MTF adjustment unit
111 partial region cutting-out unit
112 distortion correction unit
113 projective transformation unit
114 positional-shift-amount calculation unit
115 positional-shift-amount stabilization unit
116 score calculation unit
117 frame selection unit
121 distortion correction unit
122 projective transformation unit
123 panorama combination unit
300 computer
311 CPU
312 GPU
313 storage device
314 input device
315 output device
316 communication device

The invention claimed is:

1. An image processing device, comprising:
a positional-shift-amount acquisition unit that comprises:
a frame selection unit configured to select a number of frames from a first moving image and a second moving image, wherein each of the first moving image and the second moving image has a plurality of frames captured by a camera; and
a positional-shift-amount calculation unit configured to acquire positional shift amounts of the number of frames from the first moving image and the second moving image.

2. The image processing device according to claim 1, wherein the frame selection unit is further configured to select the number of frames based on at least one of sensor output or image processing results.

3. The image processing device according to claim 1, wherein the frame selection unit is further configured to select, as the number of frames, a frame of the plurality of frames, wherein the frame has a specific number of subjects, and wherein a count of the specific number of subjects is less than a threshold count.

4. The image processing device according to claim 1, wherein the frame selection unit is further configured to select, as the number of frames, a frame of the plurality of frames, and wherein the frame is obtained by regular camerawork.

5. The image processing device according to claim 1, wherein the frame selection unit is further configured to select, as the number of frames, a frame of the plurality of frames, wherein the frame has a specific number of high frequency components, wherein a count of the specific number of high frequency components is more than a threshold count, and wherein frequencies of each of the high frequency components is above a threshold frequency.

6. The image processing device according to claim 1, wherein the frame selection unit is further configured to select, as the number of frames, a frame of the plurality of frames, wherein the frame has a specific reliability that is more than a threshold reliability.

7. The image processing device according to claim 1, wherein the frame selection unit is further configured to select, as the number of frames, frames of the plurality of frames, and wherein a value of each of the positional shift amounts corresponding to each of the selected frames is in a specific range.

8. The image processing device according to claim 1, wherein the frame selection unit is further configured to:
classify the positional shift amounts into a plurality of classes, and
select, as the number of frames, a frame of the plurality of frames, wherein the frame has a positional shift amount of the positional shift amounts, and wherein the positional shift amount of the frame belongs to a specific class of the plurality of classes.

9. The image processing device according to claim 1, wherein the frame selection unit is further configured to select, as the number of frames, arbitrary consecutive frames of the plurality of frames.

10. The image processing device according to claim 1, wherein the frame selection unit is further configured to select, as the number of frames, frames of the plurality of frames having an arbitrary interval.

11. The image processing device according to claim 1, wherein the frame selection unit is further configured to skip, as the number of frames, selection of frames of the plurality of frames that are in at least one of first or last period.

12. The image processing device according to claim 1, further comprising an image combination unit configured to combine the first moving image and the second moving image based on the positional shift amounts to obtain a panoramic moving image.

13. The image processing device according to claim 12, wherein the image combination unit is further configured to obtain the positional shift amounts based on a number of the positional shift amounts.

14. The image processing device according to claim 1, further comprises a MTF adjustment unit configured to match, spatial frequencies of the first moving image and the second moving image,
wherein the positional-shift-amount calculation unit is further configured to acquire the positional shift amounts based on the matched spatial frequencies.

15. An image processing method, comprising:
in an image processing device:
selecting a number of frames from a first moving image and a second moving image, wherein each of the first moving image and the second moving image has a plurality of frames captured by a camera; and
acquiring positional shift amounts of the number of frames from the first moving image and the second moving image.

16. A as non-transitory computer-readable medium having stored thereon, computer-executable instructions which, when executed by a computer, cause the computer to execute operations, the operations comprising:
selecting a number of frames from a first moving image and a second moving image, wherein each of the first moving image and the second moving image has a plurality of frames captured by a camera; and
acquiring positional shift amounts of the number of frames from the first moving image and the second moving image.

17. The image processing device according to claim 1, further comprising an image combination unit configured to align the first moving image and the second moving image based on the acquired positional shift amounts.

* * * * *